United States Patent [19]
Bonin

[11] Patent Number: 5,980,244
[45] Date of Patent: Nov. 9, 1999

[54] SYSTEM FOR CONNECTION OF AN ANNULAR TIRE OR HOOP AND A ROTARY DRUM OR TUBE, SUCH AS A ROTARY KILN OR FURNACE

[75] Inventor: Jacques Louis Bonin, Chamforfueil, France

[73] Assignee: Technip, Courbevoie, France

[21] Appl. No.: 09/198,617

[22] Filed: Nov. 24, 1998

[30] Foreign Application Priority Data

Nov. 25, 1997 [FR] France ................................. 97 14786

[51] Int. Cl.$^6$ ........................................ F27B 7/22
[52] U.S. Cl. ............................................ 432/103; 34/121
[58] Field of Search ........................... 432/103, 104; 34/121, 123, 601

[56] References Cited

U.S. PATENT DOCUMENTS

| | | | |
|---|---|---|---|
| 2,198,820 | 4/1940 | How | 384/549 |
| 4,265,031 | 5/1981 | Kirchhoff | 432/103 |
| 4,511,266 | 4/1985 | Klotmann et al. | 432/103 |
| 5,733,115 | 3/1998 | Petersen | 432/103 |

FOREIGN PATENT DOCUMENTS

| | | |
|---|---|---|
| 966 138 | 7/1949 | Germany . |
| 28 06 832 | 8/1979 | Germany . |
| 43 12 508 | 10/1994 | Germany . |
| WO 95/34792 | 12/1995 | WIPO . |

OTHER PUBLICATIONS

Derwent WPI Acc No. 79–H3629B/197935, English language abstract of Germany 28 06 832.
Derwent WPI Acc No. 94–325397/199441, English language abstract of Germany 43 12 508.

Primary Examiner—Tu Ba Hoang
Assistant Examiner—Gregory A. Wilson
Attorney, Agent, or Firm—Pennie & Edmonds LLP

[57] ABSTRACT

A system for the connection of an annular tire (1) to a rotary drum (10) comprising blocks (2a, 2b) bearing upon the side faces of the tire and held in place by retaining elements fastened to the drum, said blocks comprising a portion (8) inserted underneath the tire, the blocks being connected in pairs by clamping means (13) independent of the tire and extending through the block portions inserted under the tire, the clamping control means (4) of the successive pairs of blocks being arranged alternately on either side of the tire.

9 Claims, 2 Drawing Sheets

5,980,244

SYSTEM FOR CONNECTION OF AN ANNULAR TIRE OR HOOP AND A ROTARY DRUM OR TUBE, SUCH AS A ROTARY KILN OR FURNACE

FIELD OF THE INVENTION

The invention relates to a system for the connection between an annular tire or hoop and a rotary drum or tube such as a rotary kiln or furnace arranged substantially concentrically inside of the annular tire or hoop. These annular tires or hoops, when they are used with rotary kilns or furnaces, are serving as a contact surface or in other words a runaway or track between rotary kilns and their supports generally provided as rollers mounted on ball bearings.

BACKGROUND OF THE INVENTION

One already knows fastening systems applicable to tires or hoops the inner surface of which is provided with teeth (DE-A-4,312,508). The object of the teeth or cogs is to take up the tangential forces bound to the rotation of the drum and of the tire and to avoid the slipping between the inner surface of the tire and the outer circumference of the drum, this in order to avoid wearing and damaging the blocks of these drums through sliding and friction. These teeth are wearing away, thereby resulting in the need to stop the kiln wherefrom result a production loss and very expensive repairs.

To avoid the problems encountered with the cogged tires or hoops and to limit the high cost of these tires or hoops, there has been proposed to use annular tires or hoops of which the inner surface is smooth, devoid of cogs; blocks are interposed between the tire and the rotary kiln. According to this conceptual design, the tire has the possibility of sliding on these blocks if it is not fastened onto the latter. This tire or hoop of the floating type is more economical but it exhibits some inconveniencies, mainly of permitting an ovalization of the rotary furnace resulting in wears of fireproof bricks constituting its inner insulation and moreover in problems of wears and maintenance of these tires.

The document WO-95/34792 provides to use an annular tire the inner surface of which is smooth and which is provided with blocks fastened to the side walls of the tire, thereby requiring the boring of the tire at many points, thereby resulting in a considerable work and reduction of the mechanical strength of the tire. Many weldings have to be carried out on the drum during the mounting to avoid the tangential and axial displacement of the blocks during operation, thereby complicating the change of the blocks when this becomes necessary. In this system, no block portion is located underneath the tire.

SUMMARY OF THE INVENTION

The object of the fastening system of the invention is to remedy the aforesaid inconveniences of the system for fastening tires with a smooth inner surface. It may in particular be easily mounted, requires a limited number only of welds on the drum, is relatively easy to be removed and requires no modification nor any perforation of the tire with a smooth inner surface, thereby making it particularly well adapted to the reconversion of units having such tires.

The system of the invention requires no adjustment or holding keys since the system is free with respect to the tire for the mounting.

The invention relates more precisely to a system for the connection of an annular tire (1) to a rotary drum (10) such as a rotary kiln or furnace, arranged substantially concentrically inside of the annular tire, the said system comprising blocks (2a, 2b) arranged in pairs in a direction parallel to the axis of the drum and likely to bear the one upon a first side face (14) of the annular tire and the other one to bear upon the opposite side face (15) of the said tire, the said blocks being held tangentially in position by retaining elements (6a, 6b) fastened to the drum, characterized in that the blocks of each pair comprise each one a relatively thin portion (8) which is inserted under the tire and which is made fast to a raised portion (9) comprising a face (16 or 17) called bearing surface which may bear upon a corresponding side face (14 or 15) of the tire and in that the blocks of each pair are connected to each other by clamping means independent of the tire (13) and extending at least in part through the said block portions inserted underneath the tire, permitting the block portions located underneath the tire and therefore the blocks themselves to come closer to each other and to firmly clamp the tire between their surfaces (16, 17) bearing upon the side faces (14, 15) of the tire, the means (4) for operating the clamping of the successive pairs of blocks being arranged, some of them on one side of the tire and the others on the other side of the tire whereas the blocks on that side which comprises no clamping operating means are held axially in place outside of the tire by a retaining element (7) fastened to the drum.

According to a preferred embodiment, the means for operating or controlling the clamping of the successive pairs of blocks are arranged alternately on one side and then on the other side of the tire.

The invention will be better understood and further objects, characterizing features, details and advantages thereof will appear as the following explanatory description proceeds with reference to the accompanying drawings given by way of non limiting example only illustrating a presently preferred specific embodiment of the invention with the above-stated reference numerals referring to the figures of the drawings wherein:

DETAILED DESCRIPTION OF THE PREFERRED EMBODIMENT

Figure 1:
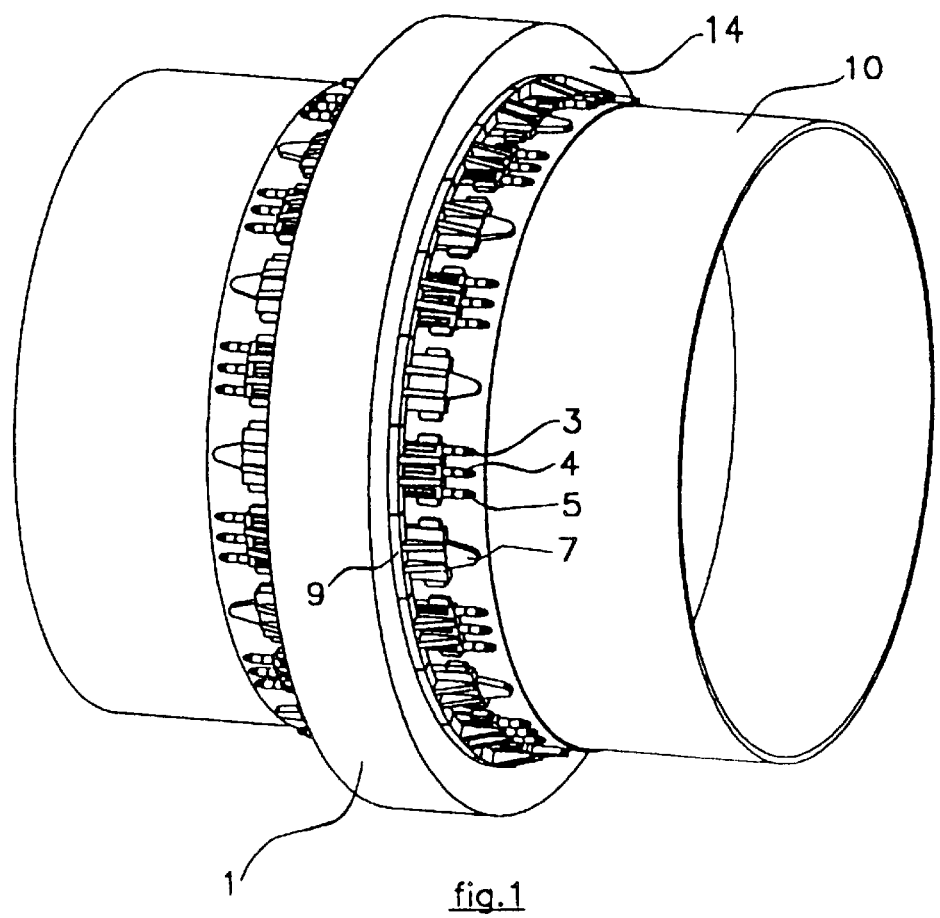
FIG. 1 is a perspective view of an embodiment of the device according to the invention after mounting thereof on the drum of a rotary furnace or kiln of which one section only is shown.

The drum 10 is arranged inside of a ring-shaped or annular circular tire or hoop 1 intented to serve as a supporting surface for the kiln or furnace. The internal diameter of the tire is greater than the external diameter of the drum in order to leave a space intended for the insertion of the blocks. The side faces of the tire are designated by 14 and 15, respectively The face 14 alone is visible on FIG. 1.

The blocks or pads 2a and 2b may have or not have the same general shape. They however comprise each one at least one relatively thin portion 8 intended to be placed below the tire, preferably substantially in contact therewith and at least one raised portion or jaw 9 comprising a face 16 or 17 intended to firmly bear after the clamping of the assembly upon a side face 14 or 15, according to the block or pad, of the tire in the manner of a vice or of a cramp, these two portions being made fast to one another. The raised portion may have such a width in the tangential direction that the raised portions of the successive pairs of blocks are substantially coming in contact with each other, this being preferred or have a smaller width with spaces left therebetween. Likewise the height of the bearing surface 16 or 17 may be equal to or smaller than the height of the side surface of the tire upon which this face has to be caused to bear.

Figure 3A:
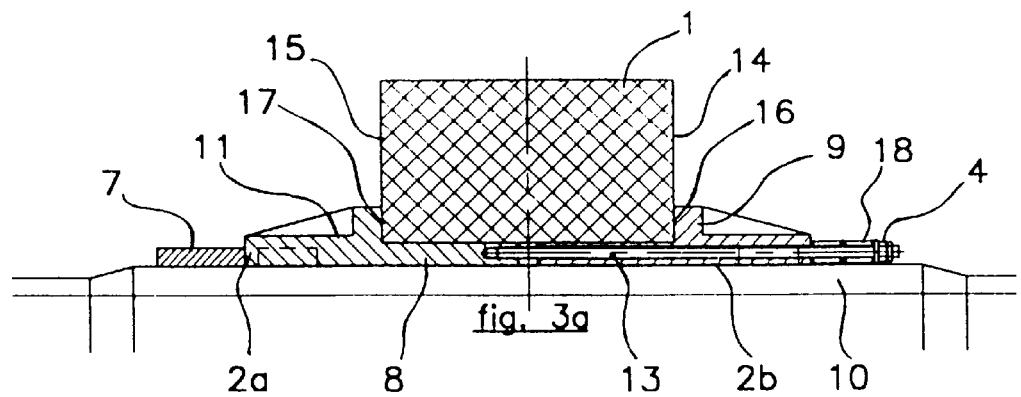
FIG. 3a is a view in radial section along the line A-A' of the embodiment of FIG. 2.
Figure 3B:
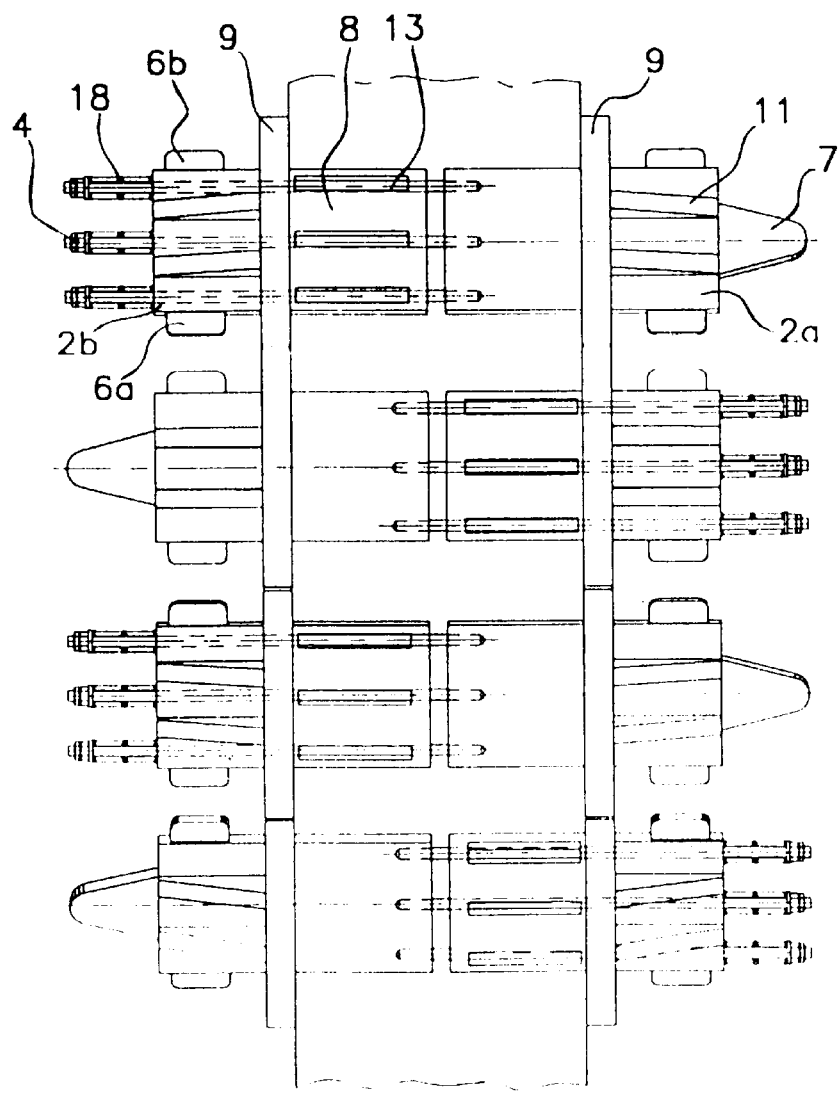
FIG. 3b is a view in section of the foregoing embodiment along a plane parallel to one edge line of the drum.

The raised portion may have different shapes; it may extend axially over the whole length of the block portion outside the tire or over one part only thereof. An advantageous arrangment is that of FIGS. 3a and 3b where the raised portion occupies one portion only of the said length of the block portion outwards of the tire, the one being in the vicinity of the tire and where shoulders such as 11 provide for the rigidity of the whole block. Recesses such as 12 may also be provided.

Figure 2:
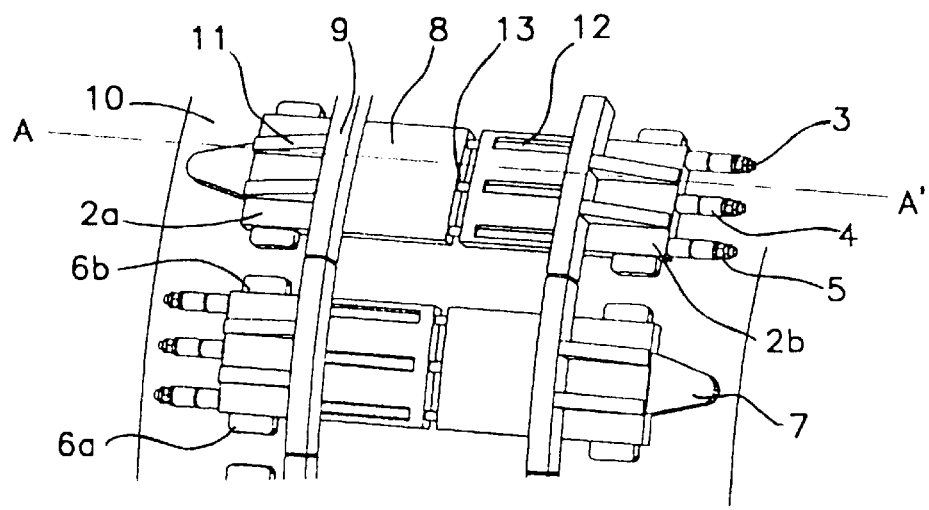
FIG. 2 is a partial perspective view on an enlarged scale of the device of FIG. 1 in which the tire has not been shown for facilitating the understanding of the invention.

Both blocks or pads of a pair of blocks are connected by clamping means independent of the tire. On FIGS. 2, 3a and 3b, there by way of example are one or more rods threaded at least at their outer end, such as 13, fitted with tightening nuts such as 4. In one embodiment, the rod is fastened to the block or pad 2a, extends through the block or pad 2b (guide means only are provided on the block 2b) and receives the nut 4 and the washers 18 on its threaded end. In another embodiment, both blocks are operating in the manner of a vice and it is then the rod which rotates in a free manner within the block 2a while engaging its external threading with an internal threading of the block 2b. The rotation of the rod from its outside end causes the blocks to move towards or away from each other.

Springs, elastic washers or equivalent means may be placed on the rod, for example underneath the nuts to facilitate the adjustment and to permit the transmission of a constant force in spite of the differential expansions between the blocks and the tire. These springs, washers or equivalent elements permit to take up the difference in expansion between the rod and the tire. On FIG. 2, three clamping rods with their respective nuts 3, 4, 5 have been shown by way of example. Any other equivalent clamping means permitting both blocks of a pair to be moved towards each other could be used.

The blocks are all held tangentially in place by retaining elements such as lugs 6a, 6b fastened to the drum whereas one retaining element or lug 7 is disposed in the immediate vicinity of or close to the outer end of each block of the type without any clamping operating means, the latter element being itself fastened to the drum. The fastening may be made by welding or otherwise.

According to an alternative embodiment of the device, there are no shoulders 11, the block having a simple parallelepipedic shape in its raised portion outside of the tire.

In a preferred embodiment, the raised portion of the blocks is made mechanically rough on its face bearing upon the tire in order to increase the coefficient of friction. In another preferred embodiment, the side faces of the tire are made mechanically rough on the portion bearing upon the blocks in order to increase the coefficient of friction.

During mounting, a play or clearance in a cold condition will be left between the blocks and the drum, depending on the difference of expansion between the rotary drum and the tire; this play or clearance will become zero during the rise of temperature, the operation taking place without any play or clearance.

The system thus provided is of the so-called stationary tire type, i.e. which does not rotate about the furnace.

It should further be pointed out that a block having clamping control means (2b) may regularly alternate on other side of the tire with a block without any clamping control means (2a) but comprising a retaining element near its end and this is preferred. There could however be an alternance of several successive blocks of a first type with several successive blocks of the second type but this is less favorable since it could result in a lack of balance and in a possible deformation of the tire or of the drum.

It should also be pointed that the words "axial", "radial" and "tangential" are referring to the axial, radial and tangential directions of the drum; more precisely the tangential direction is located in a plane perpendicular to the axis of the rotary drum.

The present invention is not limited to the embodiments described hereinabove and covers all the equivalents thereof.

What is claimed is:

1. A system for the connection of an annular tire (1) to a rotary drum (10) such as a rotary furnace, arranged substantially concentrically inside of the annular tire, the said system comprising blocks (2a, 2b) arranged in pairs along a direction parallel to the axis of the drum and adapted to bear the one on a first side face (14) of the annular tire and the other one on the opposite side face (15) of the said tire, the said blocks being tangentially held in place by retaining elements (6a, 6b) fastened to the drum, wherein the improvement consists in that the blocks of each pair comprise each one a portion (8) which is inserted under the tire and which is made fast to a raised portion (9) comprising a face (16 or 17) called bearing surface which may bear upon a corresponding side face (14 or 15) of the tire and wherein the blocks of each pair are connected to each other by clamping means (13) independent of the tire and extending at least in part through the said block portions inserted underneath the tire, permitting to move the block portions located underneath the tire and therefore the blocks themselves towards each other and to firmly clamp the tire between their bearing surfaces (16, 17) upon the side faces (14, 15) of the tires, the clamping control means (4) of the successive pairs of blocks being arranged some of them on one side of the tire and the others on the other side of the tire whereas the blocks on the side which comprises no clamping control means are held axially in place outside of the tire by a retaining element (7) fastened to the drum.

2. The system according to claim 1, wherein the raised portion of the blocks is made mechanically rough on its face bearing upon the tire in order to increase the coefficient of friction.

3. The system according to claim 1, wherein the side faces of the tire are made mechanically rough on the portion bearing upon the blocks in order to increase the coefficient of friction.

4. The system according to claim 1, wherein the raised portion of the blocks has such a width in the tangential direction of the drum that the raised portions of the successive blocks are substantially in side contact with one another on each side of the tire.

5. The system according to claim 1, wherein the raised portion of the blocks axially occupies one portion only of the block portico outside of the tire, i.e. the one near the tire and wherein axial shoulders are reinforcing the rigidity of the whole block.

6. The system according to claim 1, wherein the means for clamping both blocks of one pair of blocks, independent of the tire, consist of at least one rod fastened to a first block, extending through the second block through guide means and terminating into a threading carrying a nut.

7. The system according to claim 1, wherein the means for clamping both blocks of one pair of blocks, independent of the tire, consist of at least one rod which may freely rotate in a first block and having its external threading in engagement with the internal threading of a second block.

8. The system according to claim 6, wherein springs, elastic washers or equivalent means are provided on the rod in order to take up the difference in expansion between the rod and the tire.

9. The system according to claim 1, wherein the pairs of blocks are arranged so as to provide a regular alternance on each side of the tire, of a block provided with clamping control means and of a block devoid of these means.

* * * * *